March 24, 1970      I. W. COX      3,502,914
STEPPING MOTOR ROTOR AND STATOR WITH PLASTIC EMBEDDED
LAMINATED POLE PIECES AND METHOD OF MAKING
Filed Jan. 16, 1969

Inventor
Irvin W. Cox
by Roberts Cushman & Grover,
Attys.

United States Patent Office 3,502,914
Patented Mar. 24, 1970

3,502,914
STEPPING MOTOR ROTOR AND STATOR WITH PLASTIC EMBEDDED LAMINATED POLE PIECES AND METHOD OF MAKING
Irvin W. Cox, East Acton, Mass., assignor to Cambridge Thermionic Corporation, Cambridge, Mass., a corporation of Massachusetts
Filed Jan. 16, 1969, Ser. No. 791,730
Int. Cl. H02k 1/041, 37/00, 15/02
U.S. Cl. 310—42                                    14 Claims

ABSTRACT OF THE DISCLOSURE

A rotary stepping motor (and method of making) in which rotor and stator have equal numbers of uniformly spaced laminated pole pieces brought into alignment by flux generated with a control current. The described motor has a multiplicity of pole pieces of uniform construction, both rotor and stator having laminated pole peices fixed in proper spatial position by means of assembly rings which hold the pieces as assembled with a rigid plastic material molded into the intersticial spaces to provide a unitary structure.

BACKGROUND OF THE INVENTION

The present invention relates to the field of electrical generator or motor structures, more specifically to dynamo-electric rotary magnetic motors of the step-by-step type (Class 310; Sub-class 49), and particularly to the construction of rotors and stators therefor.

Constructions of motors which rotate through a predetermined angle upon application of a pulse of current are known. These stepping motors or impulse motors have been useful in fields where positive, accurate, discrete movements reliably responsive to high frequency pulses are desired. Applications involving the frequent repositioning of a mechanical member to successively different positions are ideally adapted for the use of a stepping motor. An example that is becoming of increasing importance is the numerical or pulse-programmed automated control of machinery. The pulsed instructions are converted directly to accurate mechanical motions by the stepping motor.

Typically stepping motor construction involves a plurality of rotor poles, an equal number of stator poles, and a coil for generating a magnetic field. The magnetic field produces forces which tend to bring the rotor poles into alignment with the stator poles, which is lowest reluctance configuration. Stepping motors are normally of multiphase constructions, which means that they employ a plurality of axially adjacent rotor-stator combinations, the poles of one combination or phase being offset from those of another by an angle that is generally a predetermined fraction of the angle between adjacent poles in a single combination. As an example, a four phase motor with thirty poles spaced 12° apart might have its four phases offset successively by 3°. The phases are pulsed sequentially to bring each rotor-stator combination from non-alignment into an aligned configuration and thereby to rotate the shaft to which the rotors are commonly joined. Such stepping motor constructions are described, for example, in Patents Nos. 1,440,729; 3,293,460; 3,204,136; and 3,327,191.

The construction of stepping motors, as exemplified by the foregoing patents has heretofore been complicated and expensive. The provision of a large number of poles when the motors are used as power devices at higher rotary speeds introduces serious problems into conventional construction methods. Often, the poles have been formed like teeth as on a gear, which requires an expensive machining operation. A large number of tedious steps customarily are necessary to assemble all pole pieces with requisite coils and to connect them with supporting structure, shafts, and the like. The detrimental effects of high frequency variations of magnetic fields is not sufficiently compensated. These difficulties naturally curtail the satisfactory and wide spread use of stepping motors.

SUMMARY OF THE INVENTION

Objects of the present invention are to provide a stepping motor which is simply, easily and inexpensively constructed using commonly available materials.

Stepping motors according to the invention, comprise a rotor and a stator, at least one of which is constructed from a plurality of pole pieces of uniform configuration. The pole pieces, in order to render them optimally serviceable for operation with high frequency fields, are laminated, with the laminations formed for example by stamping from magnetic sheet material. The pole pieces are arranged in equal spacing circumferentially of assembly ring means which interfit with the pole pieces. While they are held by these ring means, a rigid plastic material is molded into the interstices of the pole pieces to connect them and to form a unitary structure. The laminated stator pole pieces may extend freely from the outer stator surface, providing coating ribs. Further inventive aspects and novel features of stepping motors according to the invention will be apparent from the following description of a specific embodiment.

DESCRIPTION OF THE PREFERRED EMBODIMENT

Figure 1:
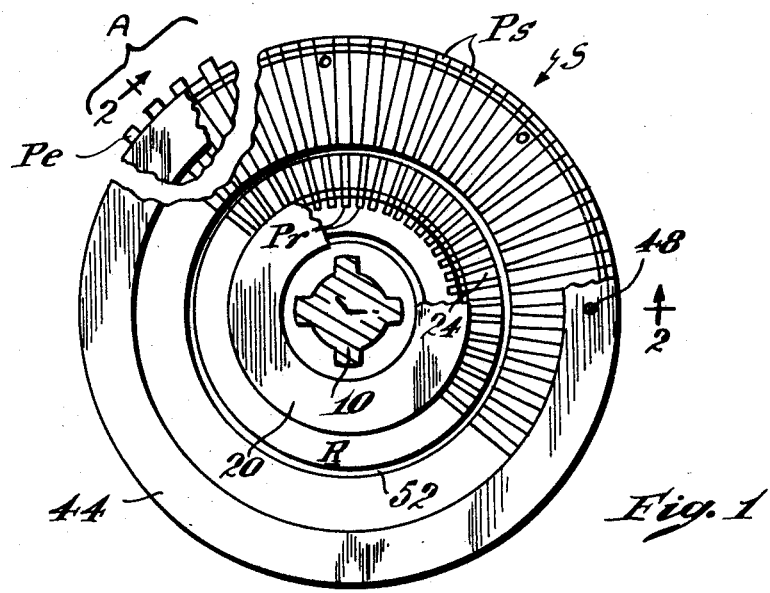
FIG. 1 is an end view of a stepping motor according to the invention, with portions broken away, and a modification with extending stator pole pieces shown at A.
Figure 2:
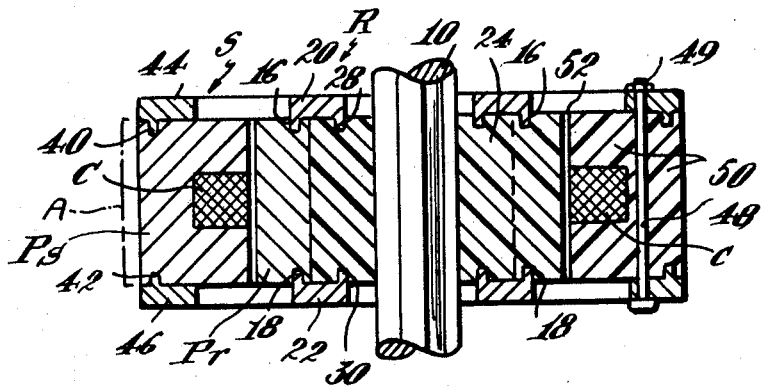
FIG. 2 is an axial section on line 2—2 of FIG. 1.

FIGS. 1 and 2 illustrate the construction of one phase component of a stepping motor which customarily will have two or more such components. The single phase shown has a rotor R mounted on a splined shaft 10 for rotation within a stator S.

Figure 3:
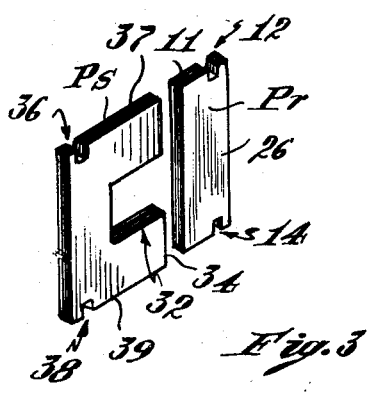
FIG. 3 is an isometric view of a radial portion of the stepping motor construction, showing the relationship of one pair of rotor and stator pole piece elements.

The rotor R comprises a plurality, here approximately 50, of rotor pole pieces P$r$ which are arranged to extend radially from the axis of a splined shaft 10 and to be uniformly spaced circumferentially around shaft 10. The rotor pole pieces P$r$ are substantially identical to one another, preferably being flat and rectangular in shaped and laminated of thin sheets of magnetic material (FIG. 3). Oriented silicon iron 0.004" thick is a suitable material. Rotor pole pieces P$r$ are easily formed by stamping, for example, and do not require for their formation the careful machining such as broaching of prior art devices.

As shown in FIG. 3, the rotor pole pieces P$r$ are provided on their top and bottom edges 11 and 13 with notches 12 and 14 respectively. The notches preferably are formed together with the laminations by contour stamping. Notches 12 and 14 are adapted to engage with annular lands or ribs 16 and 18 which project in an axial direction from rotor assembly rings 20 and 22 are made from a suitably rigid and strong material, for which non-magnetic stainless steel is preferred. The spaces between the rotor pole pieces P$r$ are filled with a rigid plastic material 24, for example, epoxy resin. The plastic material also occupies the space between shaft 10 and inner edges 26 (FIG. 3) of the rotor pole pieces P$r$ and secures the pole pieces P$r$ and rings 20 and 22 to the shaft. Assembly rings 20 and 22 can be provided with additional annular ribs 28, 30 which are seated in the plastic material. The plastic material 24, the assembly rings 20 and 22, and the rotor pole pieces P$r$ form a unitary solid structure with shaft 10.

The rotors R described herein are easily and inexpensively constructed. As previously noted, the pole pieces P$r$ are made by stamping from stock material. The pole pieces are arranged in their proper spatial positions by means of the assembly rings 20 and 22, with the annular ribs thereof engaging the notches 12 and 14 provided in the pole pieces. The assembled pole pieces and assembly rings then have the plastic material 24 cast into the interstitial spaces between the pole pieces and around a core having the cross sectional configuration of the shaft, or around the shaft 10 itself. Conventional casting or transfer molding processes can be employed. In a typical example, the assembled pole pieces P$r$, rings 20 and 22 and shaft or core 10 are placed in a cylindrical mold (not shown). The epoxy resin is mixed in the usual fashion, and poured into the mold to fill the spaces as heretofore described. When the epoxy is cured and hard, the mold is removed. Although the molding and casting of only one phase of a multiphase stepping motor has been described, it will be obvious that a plurality of such phases can be used. If molding cores are used, the rotors can be individually cast and then assembled, such as with press fit, on the shaft. If rotors are cast directly on the shaft, this can be done simultaneously for several of them.

The stator S is manufactured in a manner similar to the rotor. A plurality of stator pole pieces P$s$, equal in number to the number of rotor pole pieces P$r$, are provided. Each of the stator pole pieces P$s$ is substantially C-shaped, having an opening 32 therein along the inner edge 34 to receive the coil C. A pair of notches 36 and 38, on the top and bottom edges 37 and 39 respectively, are provided to engage annular lands or ribs 40, 42 provided on stator assembly rings 44 and 46 respectively.

It will be noted that the rotor notches 12 and 14 as well as the stator notches 36 and 38 are closely adjacent to the outer corners of the pole pieces, where they do not interfere with magnetic continuity.

The stator pole pieces P$s$ are of uniform construction, preferably being formed similar to the rotor pole pieces, of laminations stamped from thin sheets of stock magnetic material, the opening 32 and notches 36, 38 being formed during stamping. Coil C is formed with conventional techniques. The pole pieces P$s$ are arranged with coil C fitting in the openings 32, and with notches 36 and 38 engaging ribs 40 and 42 of assembly rings 44 and 46 respectively. The pole pieces P$s$ are arranged to extend radially, and to be equally spaced in a circumferential direction, so that they are alignable with the rotor pole pieces P$r$. In some cases it may be desirable or necessary to hold the coil, pole pieces, and assembly rings in firmly assembled position by means of a tie bolt or rod 48 (FIG. 2) extending through holes 49 (FIG. 1) between and secured to assembly rings 44 and 46. The interstical spaces between the stator pole pieces P$s$ are filled with a rigid plastic material 50 similar to the plastic material 24, for example, epoxy resin. The plastic material 50 is cast into the spaces using conventional casting or transfer molding techniques, for example by placing the assembled coil, pole pieces P$s$ and rings 44 and 46 into an annular mold and by pouring liquid epoxy resin into the mold. When the resin is cured and hardened, the mold is removed. The resulting stator structure is solid, rigid, and unitary particularly due to the insertion of the coil into the openings 32 prior to application of the plastic material which locks laminations and coil in place. If desired, the tie rods 48 may then be removed to provide an open passage for heat dissipation.

In the embodiment according to A of FIG. 1, the stator pole pieces protrude from the encasing plastic material as indicated at P$e$ forming cooling ribs which are desirable for the stator containing the coil with its thermal losses. The stator casting mold is then provided with internal recesses fitting, and holding, the edges of the pole piece sheets.

It will be evident that the stator components will be mounted on suitable supports in any convenient fashion, and that the rotor shaft will be supported in bearings appropriate for the purpose at hand. Since such mounting constructions are conventional they are not herein shown and described.

As will be understood, the stepping motor includes an air space 52 provided between the rotor R and stator S. As described, both rotor and stator are constructed in the same fashion. Rotors constructed according to the invention can be used with stators made according to the prior art, and stators according to the invention can be used with rotors of the prior art in many instances. The benefits of construction according to the present invention, however, apply equally to both stator and rotor. Of particular importance is the decrease in eddy current losses due to the lamination, so that the device will successfully operate at a very high pulse rate. Further benefits are simplicity of construction without the use of complex machining devices, simple assembly, use of materials for their best purposes without regard to machinability or the like, and cooling by means not requiring separate shaping techniques.

I claim:
1. A rotary stepping motor part comprising:
   a plurality of pole pieces equally spaced circumferentially in planes through the axis of rotation;
   assembly ring means symmetrical to the axis of rotation and having means for engaging opposite faces of said pole pieces; and
   rigid plastic material between adjacent pole pieces, thereby to form a unitary structure.

2. A motor part according to claim 1 wherein said assembly ring means comprises a pair of rings, each ring having as engaging means an annual rib extending axially therefrom towards the other ring, and wherein said pole pieces are provided with notches adjacent to opposite corners so as not to interfere with magnetic continuity, said notches interfitting with the ribs of respective ring means with said pole pieces therebetween.

3. A motor part according to claim 1 wherein said pole pieces are uniformly shaped and comprise laminates of thin sheets of magnetic material.

4. A motor part according to claim 1 constituting a rotor, further comprising a shaft coaxial with said pole pieces, said rigid plastic material connecting said shaft and said pole pieces; the pole pieces, the shaft and the rigid plastic material presenting a substantially cylindrical outer surface coaxial with said axis of rotation.

5. A motor part according to claim 1 constituting a stator, further comprising an annular coil coaxial with said axis of rotation and said rings; said coil, pole pieces, and plastic material presenting a substantially cylindrical inner surface coaxial with said ring.

6. A motor part according to claim 5 wherein said plastic material and said pole pieces are substantially C-shaped forming an annular groove for accepting said coil.

7. A motor part according to claim 5 wherein said pole pieces are laminated and assembled with said coil by insertion of the coil into the pole piece grooves prior to application of the plastic material which locks laminations and coil in place.

8. A motor part according to claim 5 constituting a stator and having pole pieces extending beyond the outer surface of said plastic material.

9. A rotary stepping motor comprising:
   a rotor having a shaft, a plurality of substantially flat and rectangular rotor pole pieces of uniform construction, said rotor pole pieces being equally spaced circumferentially of said shaft and extending substantially radial to the axis of said shaft, coaxial ring means interlocking with said rotor pole pieces and rigid plastic material filling the spaces between said rotor pole pieces and between said pole pieces and said shaft connecting them to the shaft, said rotor pole pieces and said rigid plastic material presenting a substantially cylindrical outer surface coaxial with said shaft axis; and a stator having a circular coil coaxial with said shaft and closely juxtaposed to said rotor outer surface, a plurality of recessed substantially C-shaped pole stator pole pieces of uniform construction, rigid plastic material filling the spaces between said stator pole pieces and having recesses conforming to the shape of the stator pole pieces, said pole pieces and said plastic material accepting said coil in their recesses, the stator pole pieces being arranged substantially radially with equal circumferential spacing and each being alignable with one of said rotor pole pieces to form a low reluctance path around said coil, and coaxial ring means interlocking with said stator pole pieces.

10. A rotary stepping motor according to claim 9 wherein said rotor and stator pole pieces are each provided with a notch in both top and bottom edges adjacent to the outer corners so as not to interfere with magnetic continuity, and said rotor and stator ring means each comprises an axially extending rib engaging corresponding notches in said pole pieces.

11. A rotary stepping motor according to claim 10 wherein each of said rotor rings is further provided with a second axially extending rib which engages with said plastic material between the inner edges of the pole pieces and the shaft.

12. A method for making annular stepping motor parts comprising forming a plurality of uniformly shaped pole pieces, each being provided with engagement means along at least one edge;

providing at least one assembly ring having means for engagement with said pole piece engagement means, arranging said pole pieces in equal circumferential spacing around said ring;

engaging said pole pieces with said ring; and molding a rigid plastic into the spaces between said pole pieces, thereby to form a unitary structure.

13. Method according to claim 12 for pole pieces having notches and assembly rings having annular ribs corresponding to the notches, wherein said engaging of rings and pole pieces comprises fitting said ribs into said notches.

14. Method according to claim 12 for stator pole pieces having openings for receiving a coil, wherein said coil is placed in said openings prior to molding said plastic into said spaces.

References Cited

UNITED STATES PATENTS

| | | | |
|---|---|---|---|
| 2,756,354 | 7/1956 | Baron | 310—43 |
| 2,922,902 | 1/1960 | Hargreaves | 310—43 |
| 3,244,919 | 4/1966 | Drenth et al. | 310—261 |
| 3,256,590 | 6/1966 | Myers | 310—43 X |

WARREN E. RAY, Primary Examiner

U.S. Cl. X.R.

29—596, 598; 310—43, 49, 180, 217, 254, 264